United States Patent
Arora et al.

(10) Patent No.: US 7,170,739 B1
(45) Date of Patent: Jan. 30, 2007

(54) ELECTROCHEMICAL DOUBLE LAYER CAPACITORS INCLUDING IMPROVED NANOFIBER SEPARATORS

(75) Inventors: Pankaj Arora, Chesterfield, VA (US); Simon Frisk, Richmond, VA (US); Lu Zhang, Midlothian, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/240,738

(22) Filed: Sep. 30, 2005

(51) Int. Cl.
*H01G 9/00* (2006.01)

(52) U.S. Cl. ............ 361/502; 361/504; 361/508; 361/512; 361/523; 361/528; 429/247; 429/249

(58) Field of Classification Search ........ 361/502–504, 361/508–512, 516–534; 29/25.01, 25.03; 429/247–249
See application file for complete search history.

(56) References Cited

U.S. PATENT DOCUMENTS

| | | | |
|---|---|---|---|
| 4,464,238 A * | 8/1984 | Caldwell et al. ............ 205/518 |
| 4,746,586 A | 5/1988 | Mizutani et al. |
| 6,236,560 B1 * | 5/2001 | Ikeda et al. .................. 361/502 |
| 6,511,774 B1 * | 1/2003 | Tsukuda et al. ............. 429/247 |
| 6,660,419 B1 * | 12/2003 | Nishida et al. ................ 429/32 |
| 6,741,450 B2 * | 5/2004 | Nakazawa et al. .......... 361/502 |

FOREIGN PATENT DOCUMENTS

| | | |
|---|---|---|
| WO | WO 99/53555 A1 | 10/1999 |
| WO | WO 01/89022 A1 | 11/2001 |
| WO | WO 03/080905 A1 | 10/2003 |

OTHER PUBLICATIONS

U.S. Appl. No. 11/240,749, filed Sep. 30, 2005, Arora et al.

* cited by examiner

*Primary Examiner*—Nguyen T. Ha

(57) ABSTRACT

Electrochemical double layer capacitors are disclosed that advantageously include separators having at least one porous layer of nanofibers having average diameters of between about 50 nm and about 1000 nm that provide improved combinations of reduced thickness, barrier against the development of soft short-circuits and low ionic resistance as compared with known capacitor separators.

10 Claims, No Drawings

ELECTROCHEMICAL DOUBLE LAYER CAPACITORS INCLUDING IMPROVED NANOFIBER SEPARATORS

FIELD OF THE INVENTION

The present invention relates to the field of electrochemical double layer capacitors (EDLC) which include separators comprising a porous layer of polymeric nanofibers.

BACKGROUND

Electrochemical double layer capacitors, including ultracapacitors and supercapacitors, are energy storage devices having an extremely large capacitance on the order of several Farads or more. Charge storage in double-layer electrochemical capacitors is a surface phenomenon that occurs at the interface between the electrodes, typically carbon, and the electrolyte. In double layer capacitors, the separator absorbs and retains the electrolyte thereby maintaining close contact between the electrolyte and the electrodes. The role of the separator is to electrically insulate the positive electrode from the negative electrode and to facilitate the transfer of ions in the electrolyte, during charging and discharging.

Electrochemical double layer capacitors are commonly used in applications which require a burst of power and quick charging; therefore it is desired to lower the ionic resistance within the capacitor and to increase the capacitance per unit volume. If the ionic resistance of the separator is too high, then during high current charging and discharging, the voltage drop will be significant resulting in poor power and energy output. It would be desirable to have a separator having reduced thickness with high porosity and low resistance, yet still able to maintain its insulating properties by keeping the positive and negative electrodes apart thus avoiding the development of short-circuits, which can ultimately lead to self-discharge. Capacitor separators should obstruct the electrophoretic migration of charged carbon particles released from one of the electrodes towards the other electrode, referred to as a "soft short-circuit" or "soft short," to reduce the likelihood of self-discharge. Such obstruction is also referred to herein as "soft short barrier." As electrochemical double layer capacitors are typically made in a cylindrically wound design in which the two carbon electrodes and separators are wound together, separators having high strength are desired to avoid short-circuits between the two electrodes. Additionally, as the capacitance of the capacitor depends on the amount of active material present within the volume of the capacitor, a thinner separator is desired.

Conventional double layer capacitor separators include wet-laid cellulose based paper that are not stable at high temperature (i.e., greater than 140° C.) or high voltage (i.e., greater than 3 V) and have unacceptable moisture adsorption. Impurities present in the separator cause problems at higher voltages. Microporous films have also been used, but have undesirably high ionic resistance and poor high temperature stability. It would be desirable to have capacitor separators with improved combinations of stability at high temperature and voltage, barrier to the electrophoretic migration of particles from one electrode to the other, lower ionic resistance and higher strength.

SUMMARY OF THE INVENTION

According to one embodiment of the invention, the invention is directed to an electrochemical double layer capacitor having a separator comprising a porous layer of polymeric nanofibers having mean diameters in the range from about 50 nm to about 1000 nm, wherein the porous nanofiber layer has a mean flow pore size of between about 0.01 µm and about 10 µm, a thickness of between about 0.1 mils (0.0025 mm) and about 5 mils (0.127 mm), a basis weight of between about 1 g/m$^2$ and about 30 g/m$^2$, a porosity of between about 20% and about 90%, a Frazier air permeability of less than about 80 cfm/ft$^2$ (24 m$^3$/min/m$^2$) and a MacMullin number of between about 2 and about 15.

DETAILED DESCRIPTION OF THE INVENTION

The electrochemical double layer capacitors of the present invention include capacitor separators having an improved combination of reduced thickness, reduced ionic resistance and good soft short barrier properties, providing a high resistance to short-circuiting. The separators useful in the capacitors of the invention have a high capacity to absorb electrolyte while maintaining excellent structural integrity and chemical and dimensional stability in use, such that the separators do not lose their soft short barrier properties even when saturated with electrolyte solution. The reduction in thickness enables the manufacture of capacitors having increased capacity, since the thinner the separator, the lower the overall thickness of the materials used in a capacitor; therefore more electrochemically active materials can be present in a given volume. The separators useful in the capacitors of the invention have low ionic resistance, therefore ions flow easily between the anode and the cathode. This is evidenced by a MacMullin number of between about 2 and about 15, even between about 2 and about 6.

The electrochemical double layer capacitor of the invention can be an electric double layer capacitor utilizing carbon based electrodes with organic or nonaqueous electrolyte, e.g., a solution of acetonitrile or propylene carbonate and 1.2 molar quaternary tetrafluoro ammonium borate salt, or aqueous electrolyte, e.g., 30–40% KOH solution.

The electrochemical double layer capacitor of the invention can alternatively be a capacitor which relies on reduction-oxidation chemical reactions to provide capacitance. Such capacitors are referred to as "pseudo capacitors" or "redox capacitors." Pseudo capacitors utilize carbon, noble metal hydrous oxide, modified transition metal oxide and conductive polymer based electrodes, as well as aqueous and organic electrolytes.

It has been found that electrochemical double layer capacitors can be made using polymeric nanofiber separators having improved combinations of stability at high temperatures, good barrier properties against soft shorts and lower ionic resistance. The separators made according to the invention can be calendered to provide small pore size, low thickness, good surface stability and high strength. The separators are stable at high temperatures and thus can withstand high temperature drying processes.

The capacitor of the present invention includes a separator comprising at least one porous layer of polymeric nanofibers having mean diameters in the range of between about 50 nm and about 1000 nm, even between about 50 nm and about 1000 nm, and even between about 50 nm and about 500 nm. The term "nanofibers" refers to fibers having diameters of less than 1,000 nanometers. Fibers having diameters in these ranges provide a separator structure with high surface area which results in good electrolyte absorption and retention due to increased electrolyte contact. The separator has a mean flow pore size of between about 0.01 µm and about 10 µm, even between about 0.01 µm and about 5 µm, and even between about 0.01 µm and about 1 µm. The separator has a porosity of between about 20% and about 90%, even between about 40% and about 70%. The high porosity of the separator also provides for good electrolyte absorption and retention in the capacitor of the invention.

A separator useful in the capacitor of the invention has a thickness of between about 0.1 mils (0.0025 mm) and about 5 mils (0.127 mm), even between about 0.1 mils (0.0025 mm) and about 3 mils (0.075 mm). The separator is thick enough to prevent soft shorting between positive and negative electrode while allowing good flow of ions between the cathode and the anode. The thin separators create more space for the electrodes inside a cell and thus provide for improved performance and life of the capacitors of the invention.

The separator has a basis weight of between about 1 $g/m^2$ and about 30 $g/m^2$, even between about 5 $g/m^2$ and about 20 $g/m^2$. If the basis weight of the separator is too high, i.e., above about 30 $g/m^2$, then the ionic resistance may be too high. If the basis weight is too low, i.e., below about 1 $g/m^2$, then the separator may not be able to reduce shorting between the positive and negative electrode.

The separator has a Frazier air permeability of less than about 80 $cfm/ft^2$ (24 $m^3/min/m^2$), even less than about 25 $cfm/ft^2$ (7.6 $m^3/min/m^2$). In general, the higher the Frazier air permeability, the lower the ionic resistance of the separator, therefore a separator having a high Frazier air permeability is desirable. At low Frazier air permeability levels, i.e., less than about 1 $cfm/ft^2$ (0.30 $m^3/min/m^2$), the air permeability of a sheet material is more accurately measured as Gurley Hill porosity, and is expressed in seconds/100 cc. The approximate relationship of Gurley Hill porosity to Frazier air permeability may be expressed as:

Gurley Hill porosity (in second)×Frazier (in $cfm/ft^2$)=3.1.

In general, the lower the Gurley Hill porosity, the lower the ionic resistance of the separator, therefore a separator having a low Gurley Hill porosity is desirable.

Polymers suitable for use in the separator include any thermoplastic and thermosetting polymers that are substantially inert to the electrolyte solution intended for use in the capacitor of the invention. Polymers suitable for use forming the fibers of the separator include, but are not limited to, aliphatic polyamide, semi-aromatic polyamide, polyvinyl alcohol, cellulose, polyethylene terephthalate, polypropylene terephthalate, polybutylene terephthalate, polysulfone, polyvinylidene fluoride, polyvinylidene fluoride-hexafluoropropylene, polymethyl pentene, polyphenylene sulfide, polytetrafluoroethylene, ethylene tetrafluoroethylene, polyacetyl, polyurethane, aromatic polyamide and blends, mixtures and copolymers thereof.

In some embodiments of the invention, it may be preferable to crosslink the polymeric nanofibers in order to maintain the porous structure and improve the mechanical integrity and ultimately the soft short barrier properties of capacitors according to the invention. Some polymers including polyvinyl alcohol tend to swell and form a gel in alkaline electrolytes, while others including polyvinylidene fluoride, polyvinylidene fluoride, polymethyl methacrylates and polyacrylonitrile tend to swell and form a gel in organic electrolytes, therefore they need to be crosslinked in order to improve their mechanical integrity and dimensional stability in use. The swelling or gelling of these polymers will cause the closing of the pores of the fibrous structure. In certain cases they will also become soft or degrade in the electrolyte leading to poor structural integrity. For example, uncrosslinked polyvinyl alcohol (PVA) separators dissolve in water and form a gel type structure in strong alkaline electrolytes. Depending on the polymer of the separator, various crosslinking agents and crosslinking conditions can be used. PVA can be crosslinked either by chemical crosslinking, electron beam crosslinking or UV crosslinking. Chemical crosslinking of a PVA nanofiber layer can be done by treating the PVA layer with a dialdehyde and an acid and subsequently neutralizing the acid with $NaHCO_3$ and washing the layer with water. Crosslinking of PVA makes it water insoluble, increases its mechanical strength and improves its chemical resistance.

The process for making the nanofiber layer(s) of the separator for use in the capacitor of the invention is disclosed in International Publication Number WO2003/080905 (U.S. Ser. No. 10/822,325), which is hereby incorporated by reference.

In one embodiment of the invention, the capacitor separator comprises a single nanofiber layer made by a single pass of a moving collection means through the process, i.e., in a single pass of the moving collection means under the spin pack. It will be appreciated that the fibrous web can be formed by one or more spinning beams running simultaneously over the same moving collection means.

The collected nanofiber layer(s) are advantageously bonded which has been found to improve the tensile strength of the separator. The high level of strength helps in cell winding and contributes to the soft short barrier properties of the separator in use, in the presence of electrolytic solution. Bonding may be accomplished by known methods, including but not limited to thermal calendering between heated smooth nip rolls, ultrasonic bonding, point bonding, and through gas bonding. Bonding increases the strength of the nanofiber layer(s) so that the layer(s) may withstand the forces associated with being handled and being formed into a useful separator, and depending on the bonding method used, adjusts physical properties such as thickness, density, and the size and shape of the pores. As previously stated, the increased strength of the separator also results in improved mechanical integrity in use in the capacitor. When thermal calendering is used, care must be taken not to over-bond the material, such that the nanofibers melt and no longer retain their structure as individual fibers. In the extreme, over-bonding would result in the nanofibers melting completely such that a film would be formed.

Separators useful in the capacitors of the invention can comprise either a single layer of polymeric nanofibers or multiple layers. When the separator comprises multiple layers, the multiple layers can be layers of the same polymeric fine fibers formed by multiple passes of the moving collection belt beneath the spin pack within the same process. The multiple layers can alternatively be layers of differing polymeric fine fibers. The multiple layers can have differing characteristics including, but not limited to, thickness, basis weight, pore size, fiber size, porosity, air permeability, ionic resistance and tensile strength.

Test Methods

Basis Weight was determined by ASTM D-3776, which is hereby incorporated by reference and reported in $g/m^2$.

Porosity was calculated by dividing the basis weight of the sample in $g/m^2$ by the polymer density in $g/cm^3$ and by the sample thickness in micrometers and multiplying by 100 and subsequently subtracting from 100%, i.e., percent porosity=100−basis weight/(density×thickness)×100.

Fiber Diameter was determined as follows. Ten scanning electron microscope (SEM) images at 5,000× magnification were taken of each nanofiber layer sample. The diameter of eleven (11) clearly distinguishable nanofibers were measured from the photographs and recorded. Defects were not included (i.e., lumps of nanofibers, polymer drops, intersections of nanofibers). The average (mean) fiber diameter for each sample was calculated.

Thickness was determined by ASTM D1777, which is hereby incorporated by reference, and is reported in mils and converted to micrometers.

Ionic Resistance in KOH electrolyte is a measure of a separator's resistance to the flow of ions, and was determined as follows. Samples were cut into small pieces (1"×1") and soaked in 40% potassium hydroxide overnight to ensure thorough wetting. Samples were sandwiched between two Teflon® shims with a 1 cm² window exposing the sample. The sandwich of Teflon® shims and sample was placed in a resistance cell having two platinum electrodes such that the window was facing the two electrodes. The resistance was measured at 1 KHz using an HP milliohmeter. The measurement was repeated without any separator between the Teflon® shims. The difference between the two readings is the resistance (milliohms) of the sample. The separator resistance is then multiplied by the area of the electrodes (1 cm² in this case) and the results are reported in milliohms-cm².

Ionic Resistance in Organic electrolyte is a measure of a separator's resistance to the flow of ions, and was determined as follows. Samples were cut into small pieces (0.75 in diameter) and soaked in 0.5 M lithium trifluoromethanesulfonate (LiTFS) in propylene carbonate:ethylene carbonate:dimethoxyethane (22:8:70) electrolyte. The separator resistance is measured using Solartron 1287 Electrochemical Interface along with Solartron 1252 Frequency Response Analyzer and the Zplot software. The test cell has a 0.29 square inch (1.875 square cm) electrode area that contacts the wetted separator. Measurements are done at an AC amplitude of 5 mV and the frequency range of 10 Hz to 100,000 Hz. The high frequency intercept in the Nyquist plot is the separator resistance (ohms). The separator resistance (ohms) is multiplied with the electrode area (1.875 square cm) to give ohms-cm².

MacMullin Number (Nm) is a dimensionless number and is a measure of the ionic resistance of the separator, and is defined as the ratio of the resistivity of a separator sample filled with electrolyte to the resistivity of an equivalent volume of the electrolyte alone. It is expressed by:

$$Nm=(R_{separator} \times A_{electrode})/(\rho_{electrolyte} \times t_{separator})$$

where $R_{separator}$ is the resistance of the separator in ohms, $A_{electrode}$ is the area of electrode in cm², $\rho_{electrolyte}$ is the resistivity of electrolyte in ohms-cm, $t_{separator}$ is the thickness of separator in cm. The resistivity of 40% KOH electrolyte at 25° C. is 2.22 ohms-cm and the resistivity of 0.5 M lithium trifluoromethanesulfonate (LiTFS) in propylene carbonate:ethylene carbonate:dimethoxyethane (22:8:70) electrolyte at 25° C. is 182 ohms-cm.

Frazier Air Permeability is a measure of air permeability of porous materials and is reported in units of ft³/min/ft². It measures the volume of air flow through a material at a differential pressure of 0.5 inches (12.7 mm) of the water. An orifice is mounted in a vacuum system to restrict flow of air through sample to a measurable amount. The size of the orifice depends on the porosity of the material. Frazier permeability is measured in units of ft³/min/ft² using a Sherman W. Frazier Co. dual manometer with calibrated orifice, and converted to units of m³/min/m².

Gurley Hill Porosity is the time required for a given volume of air (100 cubic centimeters) to pass through an area of material (one square inch) under a pressure of approximately 4.9 inches of water. Gurley Hill Porosity was determined by TAPPI T460/ASTM D726, which is hereby incorporated by reference and reported in seconds.

Mean Flow Pore Size was measured according to ASTM Designation E 1294-89, "Standard Test Method for Pore Size Characteristics of Membrane Filters Using Automated Liquid Porosimeter" which approximately measures pore size characteristics of membranes with a pore size diameter of 0.05 μm to 300 μm by using automated bubble point method from ASTM Designation F 316 using a capillary flow porosimeter (model number CFP-34RTF8A-3-6-L4, Porous Materials, Inc. (PMI), Ithaca, N.Y.). Individual samples (8, 20 or 30 mm diameter) were wetted with low surface tension fluid (1,1,2,3,3,3-hexafluoropropene, or "Galwick," having a surface tension of 16 dyne/cm). Each sample was placed in a holder, and a differential pressure of air was applied and the fluid removed from the sample. The differential pressure at which wet flow is equal to one-half the dry flow (flow without wetting solvent) is used to calculate the mean flow pore size using supplied software.

Tensile Strength was measured according to ASTM D5035-95, "Standard Test Method for Breaking Force and Elongation of Textile Fabrics (Strip Method)" and was reported in kg/cm².

EXAMPLES

Capacitor separators useful in capacitors of the present invention will be described in more detail in the following examples. An electroblowing apparatus as described in International Publication Number WO2003/080905 was used to produce the fine fiber separators as described in the Examples below.

Examples 1–7

Layers of nanofibers were made by electroblowing a solution of DuPont Nylon 66-FE 3218 polymer having a density of 1.14 g/cm³ (available from E.I. du Pont de Nemours and Company, Wilmington, Del.) at 24 weight percent in formic acid (available from Kemira Oyj, Helsinki, Finland). A spin pack having spinning nozzles and gas injection nozzles was maintained at a temperature of between about 17° C. and about 26° C., and the pressure of the solution in the spinning nozzles at between about 9 bar and about 13 bar. The spinneret was electrically insulated and a voltage of 65 kV was applied across the spinneret. Compressed air at a temperature of between about 34° C. and about 79° C. was injected through the gas injection nozzles from the spin pack at a rate of about 4.7 m³/min to about 6 m³/min and a pressure of between 240 mm H₂O and about 410 mm H₂O. The fibers exited the spinning nozzles into air at atmospheric pressure, a relative humidity of between about 19% and about 72% and a temperature of between about 13° C. and about 24° C. The fibers were laid down at a distance of between about 300 mm and about 360 mm below the exit of the pack onto a porous belt moving at a speed of about 5.7 m/min to about 14.7 m/min. A vacuum chamber beneath the porous belt assisted in the laydown of the fibers. The nanofiber layer samples were formed by depositing the fibers directly onto the moving collection belt, either in a single pass (forming a single nanofiber layer) or multiple passes (forming multiple nanofiber layers) of the moving collection belt under the spin pack, as specified below. The single nanofiber layers could not be pulled apart into more than one layer of nanofibers by ordinary means.

Example 1

A layer of nanofibers was made by electroblowing the solution through the spin pack at a temperature of 17° C. with the pressure of the solution in the spinning nozzles at 13 bar. Compressed air at a temperature of 34° C. was injected through the gas injection nozzles from the spin pack at a rate of 5 m$^3$/min and a pressure of 240 mm H$_2$O. The fibers were laid down 300 mm below the exit of the pack onto a porous belt moving at 5.7 m/min. The nanofiber layer sample was made in a single pass of the moving collection belt beneath the spin pack without a scrim, by depositing the fibers directly onto the moving collection belt.

Example 2

A layer of nanofibers was made by electroblowing the solution as in Example 1 through the spin pack at a temperature of 24° C. with the pressure of the solution in the spinning nozzles at 11 bar. Compressed air at a temperature of 60° C. was injected through the gas injection nozzles from the spin pack at a rate of 5.5 m$^3$/min and a pressure of 320 mm H$_2$O. The fibers were laid down 330 mm below the exit of the pack onto a porous belt moving at 7.4 m/min. The nanofiber layer sample was made in a single pass of the moving collection belt beneath the spin pack, without a scrim, by depositing the fibers directly onto the moving collection belt.

Example 3

A layer of nanofibers was made by electroblowing the solution as in Example 1 through the spin pack at a temperature of 22° C. with the pressure of the solution in the spinning nozzles at 10 bar. Compressed air at a temperature of 70° C. was injected through the gas injection nozzles from into the spin pack at a rate of 6 m$^3$/min and a pressure of 290 mm H$_2$O. The fibers were laid down 330 mm below the exit of the pack onto a porous belt moving at 7.4 m/min. The nanofiber layer sample was made in a single pass of the moving collection belt beneath the spin pack, without a scrim, by depositing the fibers directly onto the moving collection belt.

Example 4

Layers of nanofibers were made by electroblowing the solution as in Example 1 through the spin pack at a temperature of 20° C. with the pressure of the solution in the spinning nozzles at 12 bar. Compressed air at a temperature of 35° C. was injected through the gas injection nozzles from the spin pack at a rate of 5 m$^3$/min and a pressure of 260 mm H$_2$O. The fibers were laid down 300 mm below the exit of the pack onto a porous belt moving at 11.3 m/min. The nanofiber layer sample was made without a scrim, by depositing the fibers directly onto the moving collection belt, in three passes of the moving belt under the spin pack.

Example 5

Layers of nanofibers were made by electroblowing the solution as in Example 1 through the spin pack at a temperature of 26° C. with the pressure of the solution in the spinning nozzles at 11 bar. Compressed air at a temperature of 60° C. was injected through the gas injection nozzles from the spin pack at a rate of 5.5 m$^3$/min and a pressure of 400 mm H$_2$O. The fibers were laid down 330 mm below the exit of the pack onto a porous belt moving at 14.7 m/min. The nanofiber layer sample was made without a scrim, by depositing the fibers directly onto the moving collection belt, in three passes of the moving belt under the spin pack.

Example 6

Layers of nanofibers were made by electroblowing the solution as in Example 1 through the spin pack at a temperature of 21° C. with the pressure of the solution in the spinning nozzles at 10 bar. Compressed air at a temperature of 71° C. was injected through the gas injection nozzles from the spin pack at a rate of 5 m$^3$/min and a pressure of 410 mm H$_2$O. The fibers were laid down 330 mm below the exit of the pack onto a porous belt moving at 14.7 m/min. The nanofiber layer sample was made without a scrim, by depositing the fibers directly onto the moving collection belt, in three passes of the moving belt under the spin pack.

Example 7

Layers of nanofibers were made by electroblowing the solution as in Example 1 through the spin pack at a temperature of 23° C. with the pressure of the solution in the spinning nozzles at 13 bar. Compressed air at a temperature of 45° C. was injected through the gas injection nozzles from the spin pack at a rate of 5.5 m$^3$/min. The fibers were laid down 300 mm below the exit of the pack onto a porous belt moving at 5 m/min. The nanofiber layer sample was made without a scrim, by depositing the fibers directly onto the moving collection belt, in four passes of the moving belt under the spin pack.

To illustrate the effects of bonding, the nanofiber layer sample of Example 7 was calendered using the conditions listed in Table 1.

TABLE 1

| Bonding Conditions | | | Thickness μm | Gurley Hill porosity sec | MD Tensile Strength kg$_f$/cm$^2$ |
|---|---|---|---|---|---|
| Temp. °F. (°C.) | Pressure pli (kg/cm) | Line Speed ft/min (m/min) | | | |
| Unbonded | | | 54 | 0.4 | 30 |
| 100 (38) | 500 (89) | 10 (3.0) | 31 | 0.6 | 79 |
| 100 (38) | 1000 (179) | 10 (3.0) | 30 | 1.1 | 87 |
| 100 (38) | 1500 (268) | 10 (3.0) | 27 | 1.5 | |
| 100 (38) | 2000 (357) | 10 (3.0) | 27 | 1.4 | 82 |
| 250 (120) | 500 (89) | 10 (3.0) | 27 | 1.1 | 100 |
| 250 (120) | 1000 (179) | 10 (3.0) | 24 | 3.7 | 122 |
| 250 (120) | 1500 (268) | 10 (3.0) | 30 | 5.0 | 93 |
| 250 (120) | 2000 (357) | 10 (3.0) | 28 | 7.0 | 100 |

As can be seen from Table 1, bonding the nanofiber layers resulted in reduced thickness and increased strength. Capacitor separators thus bonded have greater density and greater barrier to shorts in use.

TABLE 2

| Ex. | Thickness mil (mm) | Basis Weight g/m² | Fiber Dia. nm | Frazier Air Permeability cfm/ft² (m³/min/m²) | MD Tensile Strength kg$_f$/cm² | Mean Flow Pore Size μm | Porosity % | Ionic Resistance* ohm-cm² | MacMullin No. |
|---|---|---|---|---|---|---|---|---|---|
| 1 | 1.53 (0.039) | 10.4 | 414 | 25.5 (7.77) | 18.2 | 3.97 | 76.6 | 1.92 | 2.7 |
| 2 | 1.58 (0.040) | 10.5 | 677 | 56.2 (17.1) | 24.8 | 6.70 | 77.2 | 2.51 | 3.5 |
| 3 | 1.37 (0.035) | 10.6 | 946 | 65.6 (20.0) | 35.1 | 7.25 | 73.3 | 2.64 | 4.2 |
| 4 | 3.60 (0.091) | 28.5 | 459 | 8.40 (2.56) | 25.2 | 2.65 | 72.7 | 3.96 | 2.4 |
| 5 | 3.80 (0.096) | 29.9 | 647 | 13.1 (3.99) | 35.1 | 4.17 | 72.8 | 5.31 | 3.1 |
| 6 | 3.55 (0.090) | 29.0 | 945 | 18.2 (5.55) | 37.8 | 4.98 | 71.8 | 4.51 | 2.8 |
| 7 | 2.12 (0.054) | 14.7 | 430 | 11.8 (3.60) | 31.0 | 2.69 | 76.1 | | |

*as measured in 0.5 molar lithium trifluoromethanesulfonate (LiTFS), propylene carbonate:ethylene carbonate:dimethoxyethane (22:8:70) electrolyte solution.

The separators discussed in Examples 1–7 exhibit low ionic resistance and good barrier properties. The ionic resistance of the separators is reported as the MacMullin number and depends on the thickness, and porosity of the separator. Good barrier is provided by the small pore size despite the lower thickness, and is further evidenced by the superior tensile strengths of the fabrics. Separators with very fine fibers exhibit good barrier properties despite low thickness since a greater number of fibers can be packed in the same separator structure.

Example 8

Layers of nanofibers were made by electroblowing a solution of DuPont Elvanol® polyvinyl alcohol (PVA) polymer 80-18 having a density of 1.26 g/cm³ (available from E.I. du Pont de Nemours and Company, Wilmington, Del.) at 16 weight % in water, substantially as set forth in Example 1. The temperature of the solution in the pack was 42° C. with the pressure of the solution in the spinning nozzles at 2.5 bar. The spinneret was electrically insulated and applied with a voltage of 80 kV. Compressed air at a temperature of 60° C. was injected through the gas injection nozzles from the spin pack at a rate of 1000 L/min. The fibers were laid down 300 mm below the exit of the pack onto a porous belt moving at 1 m/min. A vacuum chamber beneath the porous belt assisted in the laydown of the fibers. The nanofiber layer sample was laid onto a scrim (a 30 g/m² PET spunbond fabric available from Kolon Industries, Inc., Korea) positioned on the porous belt in two passes of the moving collection belt beneath the spin pack. The nanofiber layer sample was passed through a dryer at 100° C.

The nanofiber layer sample was then removed from the scrim, and subjected to crosslinking as follows. A reaction liquid was prepared by mixing 20 ml of concentrated H$_2$SO$_4$, 200 g of Na$_2$SO$_4$ and 50 g of gluteraldehyde in 1000 g of water. A 8 inch by 14 inch sample of the nanofiber layer sample was immersed in the reaction liquid at a temperature of 80° C. for between 1 min and 2 min. The sample was then immersed in water for 5 min, then immersed in 0.1 M of NaHCO$_3$ for 5 min and then immersed in water for 10 min. The resulting sample was dried by removing water from the sample.

Example 9

Layers of nanofibers were made by electroblowing the solution at the same conditions as in Example 8, with the exceptions that the applied voltage was 76 kV and the line speed was 0.5 m/min. The nanofiber layer sample was laid onto a scrim (a 30 g/m² PET spunbond fabric available from Kolon Industries, Inc., Korea) positioned on the porous belt in two passes of the moving collection belt beneath the spin pack.

The nanofiber layer sample was then removed from the scrim, and subjected to crosslinking as described in Example 8.

Example 10

Layers of nanofibers were made by electroblowing the solution at the same conditions as in Example 8, with the exceptions that the applied voltage was 75 kV and the line speed was 0.3 m/min. The nanofiber layer sample was laid onto a scrim (a 30 g/m² PET spunbond fabric available from Kolon Industries, Inc., Korea) positioned on the porous belt in two passes of the moving collection belt beneath the spin pack.

The nanofiber layer sample was then removed from the scrim, and subjected to crosslinking as described in Example 8.

Example 11

A layer of nanofibers was made by electroblowing the solution as described in Example 8 with the following exceptions. The electroblowing solution was DuPont polyvinyl alcohol (PVA) polymer 8018 at 17 weight percent in water. The temperature of the solution in the pack was 62° C. with the pressure of the solution in the spinning nozzles at 3.4 bar. The spinneret was electrically insulated and applied with a voltage of 70 kV. Compressed air at a temperature of 92° C. was injected through the gas injection nozzles from the spin pack at a rate of 700 L/min. The fibers were laid down 450 mm below the exit of the pack onto a porous belt moving at 1.3 m/min. The nanofiber layer sample was laid onto a scrim (a 30 g/m² PET spunbond fabric available from Kolon Industries, Inc., Korea) positioned on the porous belt in a single pass of the moving collection belt beneath the spin pack.

The nanofiber layer sample was then removed from the scrim, and subjected to cross-linking as described in Example 8, with the exception that a 8 inch by 14 inch sample was immersed in the reaction liquid for 10 min. This is listed in Table 3 as Example 11.

TABLE 3

| Ex. | Thickness mil (mm) | Basis Weight g/m² | Fiber Dia. nm | Frazier Air Permeability cfm/ft² (m³/min/m²) | Gurley Hill Porosity sec | MD Tensile Strength $kg_f$/cm² | Mean Flow Pore Size μm | Porosity % | Ionic Resistance** milliohm-cm² | MacMullin No. |
|---|---|---|---|---|---|---|---|---|---|---|
| 8 | 0.8 (0.020) | 12.4 | 395 | 0.659 (0.201) | 4.70 | 228 | 0.49 | 46.5 | 21 | 4.7 |
| 9 | 1.2 (0.030) | 17.9 | 334 | 0.425 (0.130) | 7.30 | 210 | 0.48 | 48.5 | 34 | 5.1 |
| 10 | 1.4 (0.036) | 21.1 | 295 | 0.352 (0.107) | 8.80 | 204 | 0.44 | 48.0 | 46 | 5.9 |
| 11 | 1.27 (0.032) | 8.40 | 2150 | 107 (32.6) | 0.029 | | | 77.2 | 26.8 | 3.8 |

**as measured in 40% KOH electrolyte solution.

As can be seen from Table 3, the crosslinked PVA samples of Examples 8–11 have a good balance of ionic resistance and soft short barrier properties. The small pore size of the separators will provide more resistance to soft shorts. The separators offer very low resistance to the flow of ions.

What is claimed is:

1. An electrochemical double layer capacitor having a separator comprising a porous layer of polymeric nanofibers having mean diameters in the range from about 50 nm to about 1000 nm, wherein the porous nanofiber layer has a mean flow pore size of between about 0.01 μm and about 10 μm, a thickness of between about 0.1 mils (0.0025 mm) and about 5 mils (0.127 mm), a basis weight of between about 1 g/m² and about 30 g/m², a porosity of between about 20% and about 90%, a Frazier air permeability of less than about 80 cfm/ft² (24 m³/min/m²) and a MacMullin number of between about 2 and about 15.

2. The capacitor of claim 1 wherein the separator has an ionic resistance of between about 1 ohms-cm² and about 5 ohms-cm² in 0.5 molar lithium trifluoromethanesulfonate (LiTFS), propylene carbonate: ethylene carbonate: dimethoxyethane (22:8:70) electrolyte solution.

3. The capacitor of claim 1 wherein the separator has an ionic resistance of less than about 100 milliohms-cm² in 40% potassium hydroxide (KOH) electrolyte solution.

4. The capacitor of claim 1 wherein the separator has a MacMullin number of between about 2 and about 6.

5. The capacitor of claim 1 wherein the fibers are formed of a polymer selected from the list consisting of aliphatic polyamide, semi-aromatic polyamide, polyvinyl alcohol, cellulose, polyethylene terephthalate, polypropylene terephthalate, polybutylene terephthalate, polysulfone, polyvinylidene fluoride, polyvinylidene fluoride-hexafluoropropylene, polymethyl pentene, polyphenylene sulfide, polytetrafluoroethylene, ethylene tetrafluoroethylene, polyacetyl, polyurethane, aromatic polyamide and blends, mixtures and copolymers thereof.

6. The capacitor of claim 1 wherein the capacitor is a supercapacitor, ultracapacitor, or pseudo capacitor.

7. The capacitor of claim 1 where the electrolyte used is an aqueous electrolyte, or organic electrolyte.

8. The capacitor of claim 1 wherein the separator comprises multiple porous nanofiber layers.

9. The capacitor of claim 8 wherein the separator comprises multiple porous nanofiber layers comprising differing polymers.

10. The capacitor of claim 8 wherein the separator comprises multiple porous nanofiber layers having differing characteristics selected from the list consisting of thickness, basis weight, pore size, fiber size, porosity, air permeability, ionic resistance and tensile strength.

* * * * *